United States Patent
Miyamoto

[11] Patent Number: 5,947,454
[45] Date of Patent: Sep. 7, 1999

[54] LIQUID-ENCAPSULATED BUSHING

[75] Inventor: Yasuo Miyamoto, Wako, Japan

[73] Assignee: Honda Giken Kogyo Kabushiki Kaisha, Tokyo, Japan

[21] Appl. No.: 09/087,846

[22] Filed: Jun. 1, 1998

[30]    Foreign Application Priority Data

Jun. 3, 1997    [JP]    Japan ................................... 9-145500

[51] Int. Cl.$^6$ ....................................................... F16F 5/00
[52] U.S. Cl. ................................. 267/140.12; 267/293
[58] Field of Search ........................ 267/140.11–140.13, 267/219, 273, 276, 279, 280, 281, 282, 293, 294

[56]    References Cited

U.S. PATENT DOCUMENTS

| | | | |
|---|---|---|---|
| 5,221,077 | 6/1993 | Noguchi | 267/140.12 |
| 5,509,643 | 4/1996 | Carstens et al. | 267/140.11 |
| 5,690,320 | 11/1997 | Kanda | 267/140.12 |

FOREIGN PATENT DOCUMENTS

A-2-121648   10/1990   Japan .

*Primary Examiner*—Chris Schwartz
*Attorney, Agent, or Firm*—Nikaido, Marmelstein, Murray & Oram LLP

[57]            ABSTRACT

To achieve a lowering of a dynamic spring constant in an air column resonance region of a tire without increasing the hardness of an elastic body of a liquid-encapsulated bushing, an outer tube and an inner tube are connected by a bushing rubber. Front liquid chambers and rear liquid chambers are placed in communication with each other by first communication passages. The upper liquid chambers and the rear liquid chambers are placed in communication with each other by second communication passages and a third communication passage. If a load of 80–250 Hz is input in a Z–Z' direction, the peak of the dynamic spring constant is shifted toward a higher-frequency side by the third communication passage and a dynamic spring constant in the air column resonance region (220–250 Hz) of a tire is lowered, thereby reducing road noise.

8 Claims, 9 Drawing Sheets

LIQUID-ENCAPSULATED BUSHING

FIELD OF THE INVENTION

The present invention relates to a liquid-encapsulated bushing in which a plurality of liquid chambers are defined to face an elastic body which connects an outer tube and an inner tube, each having an axis parallel to each other. The plurality of liquid chambers are placed in communication with each other by a plurality of communication passages.

BACKGROUND OF THE INVENTION

FIG. 8 shows a conventional liquid-encapsulated bushing B. As is apparent from FIG. 8, the liquid-encapsulated bushing B includes an outer tube 04 which integrally has a ring 01, two stoppers 02 and 02 and partition members 03 and 03. An inner tube 07 integrally has a support shaft 05 and a collar 06. A bushing rubber 08 and rubber stoppers 09 and 09 are disposed between the outer tube 04 and the inner tube 07. Four liquid chambers $R_{FU}$, $R_{FL}$, $R_{RU}$ and $R_{RL}$ are defined between the bushing rubber 08 and the rubber stoppers 09 and 09. The two upper and lower front liquid chambers $R_{FU}$ and $R_{FL}$, which are positioned on a front side, communicate with the two upper and lower rear liquid chambers $R_{RU}$ and $R_{RL}$, which are positioned on a rear side, through first communication passages $O_1$ and $O_1$, respectively. Communication between the front liquid chambers $R_{FU}$ and $R_{FL}$ and communication between the rear liquid chambers $R_{RU}$ and $R_{RL}$ are provided through second communication passages $O_2$ and $O_2$, respectively.

If a low-frequency load of approximately 15 Hz is input in forward and rearward directions (an X–X' direction) and the outer tube 04 and the inner tube 07 move relative to each other, the bushing rubber 08, which connects the outer tube 04 and the inner tube 07, is deformed. Furthermore, the volumes of either the front liquid chambers $R_{FU}$ and $R_{FL}$ or the rear liquid chambers $R_{RU}$ and $R_{RL}$ are enlarged, while the other volumes are reduced. Thus, a liquid flows back and forth between the front liquid chambers $R_{FU}$ and $R_{FL}$ and the rear liquid chambers $R_{RU}$ and $R_{RL}$ through the first communication passages $O_1$ and $O_1$, respectively, whereby the low-frequency load is damped. If a medium-frequency load of approximately 80–250 Hz is input in upward and downward directions (a Z–Z' direction) and the outer tube 04 and the inner tube 07 move relative to each other, the volumes of either the upper liquid chambers $R_{FU}$ and $R_{RU}$ or the lower liquid chambers $R_{FL}$ and $R_{RL}$ are enlarged, while the other volumes are reduced. Thus, the liquid flows back and forth between the upper liquid chambers $R_{FU}$ and $R_{RU}$ and the lower liquid chambers $R_{FL}$ and $R_{RL}$ through the second communication passages $O_2$ and $O_2$, respectively, whereby the medium-frequency load is damped.

FIG. 9 shows a variation characteristic (shown by a solid line) of a dynamic spring constant due to a variation in the frequency of the upward and downward loads (the Z–Z' direction) which are applied to the liquid-encapsulated bushing B having the above-described structure. As compared with a variation characteristic (shown by a dotted line) of a bushing having no liquid chambers, the dynamic spring constant is lowered in the region of input frequencies of 80–230 Hz, whereby road noise can be reduced. However, in the conventional liquid-encapsulated bushing B, since the lowering of the dynamic spring constant is insufficient in the air column resonance region (220–250 Hz) of a tire which is contained in road noise components, a further lowering of the dynamic spring constant in this region has been desired. Although it is also possible to lower the dynamic spring constant by increasing the hardness of the bushing rubber 08, this method lowers riding comfort.

SUMMARY OF THE INVENTION

The present invention has been made in view of the above-described problems. Thus, an object of the present invention is to achieve a lowering of a dynamic spring constant in an air column resonance region of a tire without increasing the hardness of an elastic body of a liquid-encapsulated bushing.

To achieve the above object, the invention according to a first embodiment provides a liquid-encapsulated bushing comprising a plurality of liquid chambers defined to face an elastic body. The elastic body connects an outer tube and an inner tube, each having an axis parallel to each other. The plurality of liquid chambers are placed in communication with each other by a plurality of communication passages to damp a low-frequency load, which is input in a first direction perpendicular to the axis, and a medium-frequency load, which is input in a second direction, which is perpendicular to the axis and the first direction. The plurality of communication passages include a first communication passage which is defined in the outer tube to provide communication among the liquid chambers whose volumes vary when the load in the first direction is input and the outer tube and the inner tube move relative to each other. A second communication passage is defined between the outer tube and the inner tube to provide communication among the liquid chambers whose volumes vary when the load in the second direction is input and the outer tube and the inner tube move relative to each other. A third communication passage is disposed in parallel with the second communication passage and provides communication among the liquid chambers whose volumes vary. The third communication passage is defined in the outer tube.

According to the above-described feature, if the low-frequency load is input in the first direction and the outer tube and the inner tube move relative to each other, a liquid flows back and forth between the liquid chambers with enlarged volumes and the liquid chambers with reduced volumes, through the first communication passage, whereby the low-frequency load is damped. If the medium-frequency load is input in the second direction and the outer tube and the inner tube move relative to each other, the liquid flows back and forth between the liquid chambers with enlarged volumes and the liquid chambers with reduced volumes, through the second communication passage and the third communication passage, whereby the medium-frequency load is damped. Since the sum of the cross-sectional areas of the second and the third communication passages is increased by the addition of the third communication passage, the peak of a dynamic spring constant of the liquid-encapsulated bushing in the second direction is shifted toward a higher-frequency side. Therefore, the dynamic spring constant is lowered in the air column resonance region of a tire on a side having a lower frequency than the peak.

The low-frequency load indicates a load of a frequency of approximately 15 Hz and the medium-frequency load indicates a load of a frequency of approximately 80–250 Hz, but the values of these frequencies are not limited by the described embodiments.

The present invention according to another aspect has the third communication passage formed as two passages which are defined along the axis on opposite sides of the axis.

According to the above feature, it is possible to finally adjust the dynamic spring constant by varying the shapes of the two third communication passages.

BRIEF DESCRIPTION OF THE DRAWINGS

A mode for carrying out the present invention will be described below with reference to the embodiments of the present invention which are shown in the accompanying drawings.

FIGS. 1 to 5 illustrate a first embodiment of the present invention, wherein

FIG. 1 is a perspective view of a rear suspension using the liquid-encapsulated bushing;

FIG. 2 is an enlarged cross-sectional view taken along a line 2—2 of FIG. 1 (a cross-sectional view taken along a line 2—2 of FIG. 3);

FIG. 3 is a cross-sectional view taken along a line 3—3 of FIG. 2;

FIG. 4 is a graph showing a relationship between frequency and dynamic spring constant;

FIG. 5 is a graph showing a relationship between frequency and phase difference;

DESCRIPTION OF THE PREFERRED EMBODIMENTS

Figure 1:
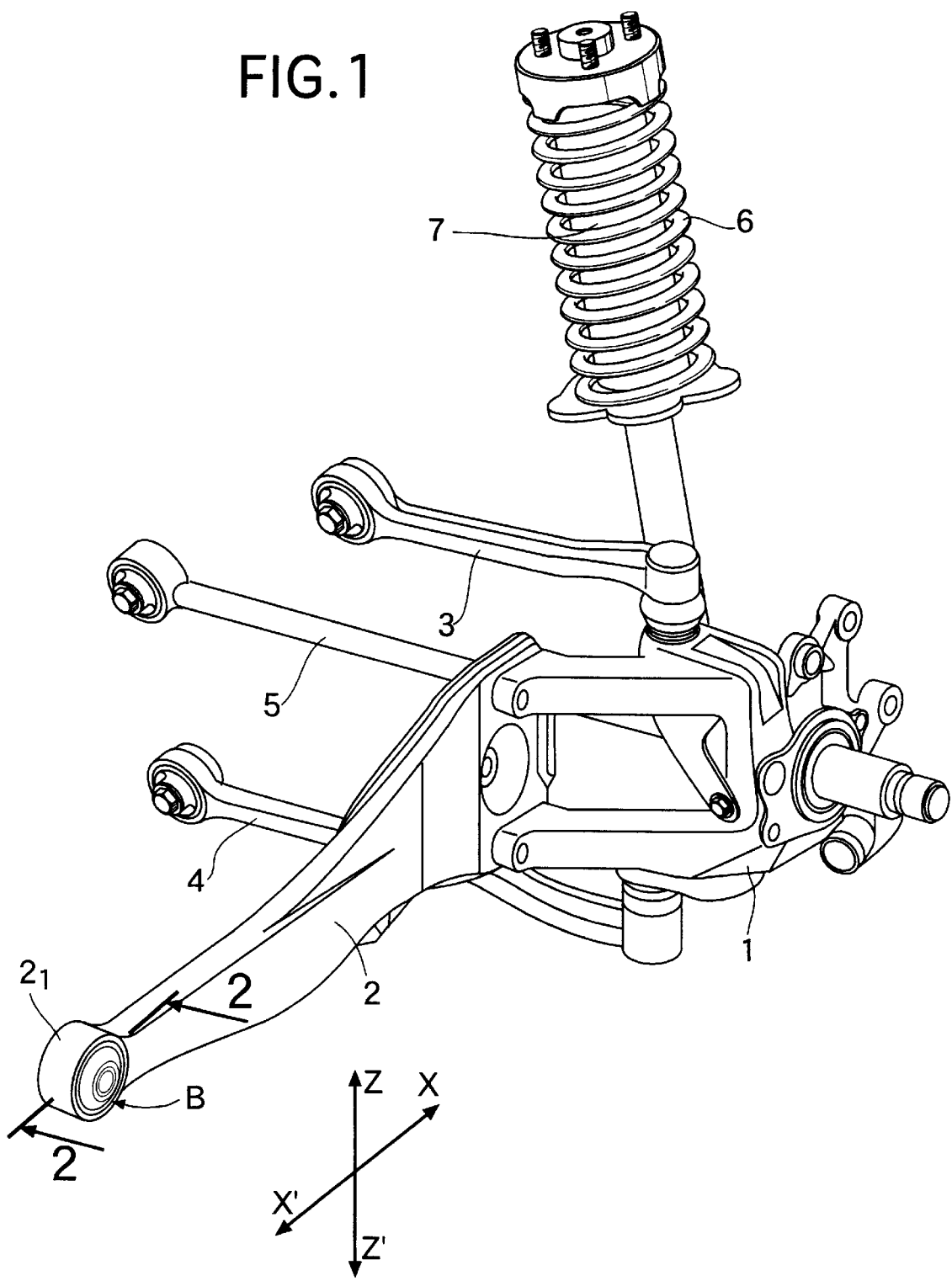

FIG. 1 shows a suspension for a left rear wheel of an automobile. A knuckle 1, which rotatably supports a wheel, which is not shown, is connected to a vehicle body by a radius rod 2 which extends forward. The knuckle 1 is also connected to the vehicle body by an upper arm 3, a front lower arm 4 and a rear lower arm 5 which extend transversely. The upward and downward motions of the knuckle 1 are absorbed by a shock absorber 7 integrally provided with a coil spring 6. The liquid-encapsulated bushing B of the present embodiment is used for supporting a front end of the radius rod 2 on the vehicle body. The bushing B performs damping of a low-frequency vibration of approximately 15 Hz which is input from a road surface through the wheel to the vehicle body in forward and rearward directions thereof (in an X–X' direction or a first direction). The bushing B also performs damping of a mediumfrequency vibration of approximately 80–250 Hz which is input from the road surface through the wheel to the vehicle in upward and downward directions thereof (in a Z–Z' direction or a second direction).

Figure 2:
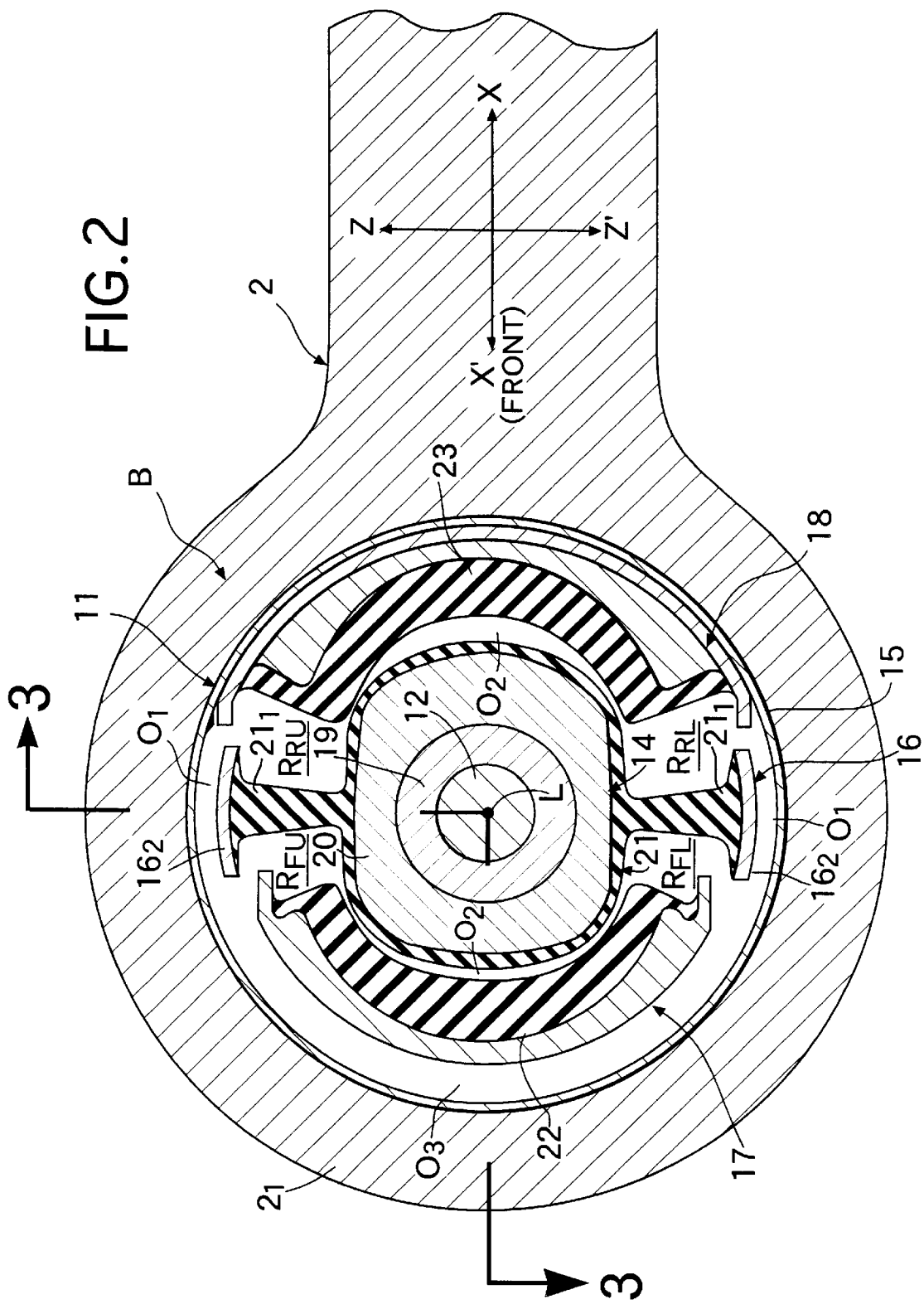
Figure 3:
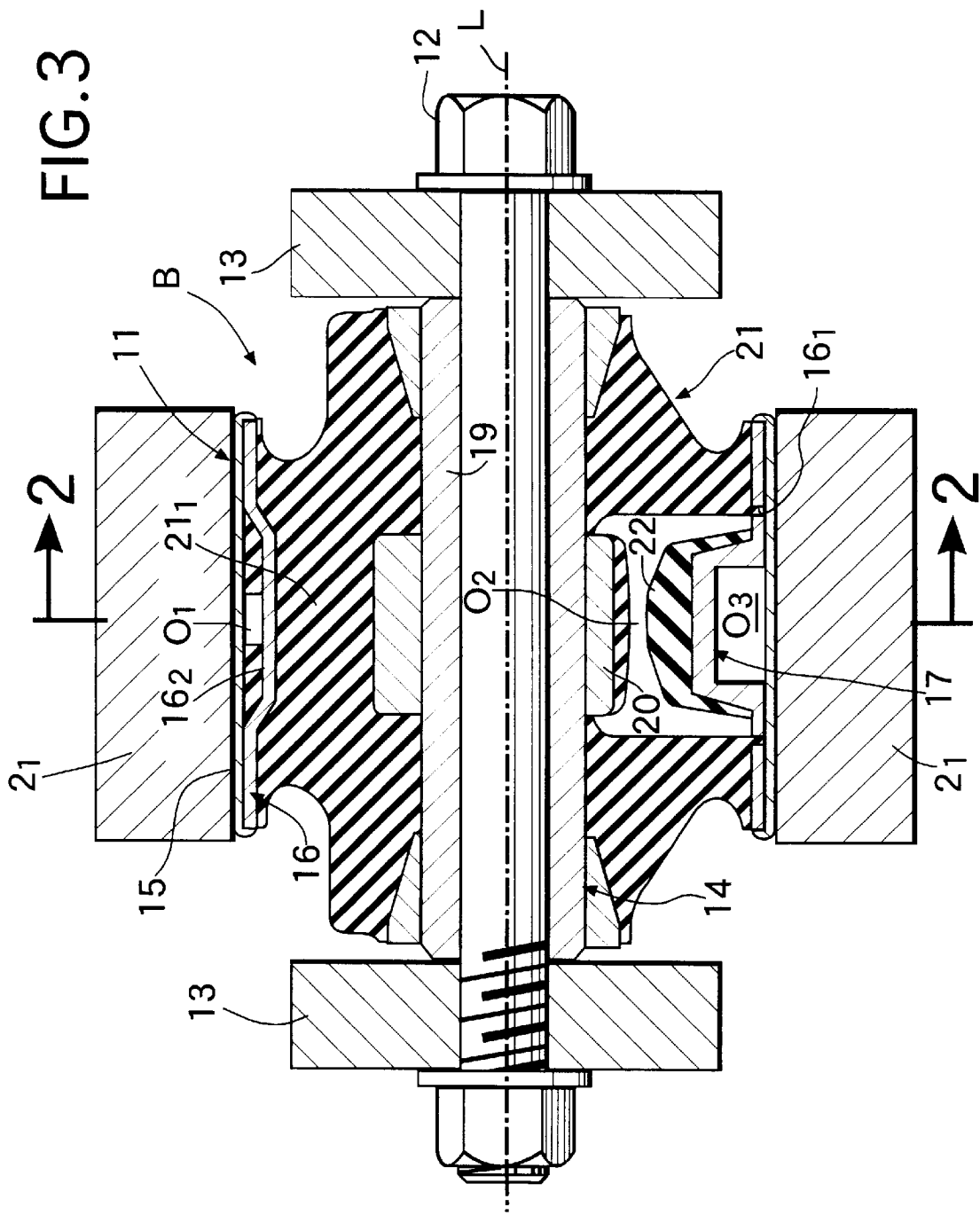

As shown in FIGS. 2 and 3, the liquid-encapsulated bushing B is provided with a larger-diameter outer tube 11. The outer tube 11 is fixed by press-fitting to an annular mounting portion $2_1$ formed in a front end portion of the radius rod 2. The bushing B is also provided with a smaller-diameter inner tube 14 which is disposed concentrically with a common axis L in the inside of the outer tube 11. The inner tube 14 is fixed to mounting brackets 13 and 13 of the vehicle body by a bolt 12. The outer tube 11 is provided with a) a simply cylindrical outer member 15, b) an approximately cylindrical inner member 16 which is fixed to an inner periphery of the outer member 15, c) an approximately arcuate front stopper 17 which is fixed to an inner surface of the outer member 15 in such a manner as to be fitted in notches 16, of the inner member 16 at a position forward of the inner tube 14, and d) an approximately arcuate rear stopper 18 which is fixed to the inner surface of the outer member 15 at a position rearward of the inner tube 14. The inner tube 14 includes a) a support pipe 19 through which the bolt 12 is inserted, and b) a collar 20 which is fixed to an outer periphery of the support pipe 19.

A bushing rubber 21 is joined to the outer tube 11 and the inner tube 14 by baking. A front rubber stopper 22 and a rear rubber stopper 23 are respectively fixed to an inner surface of the front stopper 17 and an inner surface of the rear stopper 18 by baking. The inner member 16 of the outer tube 11 is separated radially inward from the outer member 15 at reduced-radius portions $16_2$ and $16_2$ located at two upper and lower positions, where a pair of upper and lower first communication passages $O_1$ and $O_1$ are defined. Second communication passages $O_2$ and $O_2$, which extend in an arcuate shape, are respectively defined a) between the bushing rubber 21 and the front rubber stopper 22, and b) between the bushing rubber 21 and the rear rubber stopper 23. In addition, a third communication passage $O_3$, which extends in an arcuate shape, is defined between the front stopper 17 and the outer member 15. That is, the third communication passage $O_3$ is defined in parallel with the second communication passages $O_2$.

The bushing rubber 21 is provided with a pair of upper and lower partition walls $21_1$ and $21_1$ which extend from the collar 20 of the inner tube 14 to the respective reduced-radius portions $16_2$ and $16_2$ of the inner member 16 of the outer tube 11. A pair of upper and lower front liquid chambers $R_{FU}$ and $R_{FL}$ are defined in front of both partition walls $21_1$ and $21_1$, respectively. A pair of upper and lower rear liquid chambers $R_{RU}$ and $R_{RL}$ are defined at the back of both partition walls $21_1$ and $21_1$, respectively. The upper front and rear liquid chambers $R_{FU}$ and $R_{RU}$ communicate with each other through the upper first communication passage $O_1$. The lower front and rear liquid chambers $R_{FL}$ and $R_{RL}$ communicate with each other through the lower first communication passage $O_1$. The upper and lower front liquid chambers $R_{FU}$ and $R_{FL}$ communicate with each other through the front second communication passage $O_2$ and the third communication passage $O_3$. The upper and the lower rear liquid chambers $R_{RU}$ and $R_{RL}$ communicate with each other through the rear second communication passage $O_2$.

The operation of the embodiment of the present invention having the above-described construction will now be described.

A low-frequency load of approximately 15 Hz is input to the outer tube 11 of the liquid-encapsulated bushing B through the radius rod 2 by a vibration transmitted from a tire from the road surface during traveling of the vehicle. This low-frequency load acts in the forward and rearward directions (in the X–X' direction of FIG. 2). If the outer tube 11 relatively moves in the forward and the rearward directions with respect to the inner tube 14, the bushing rubber 21 is deformed and the volumes of the front liquid chambers $R_{FU}$ and $R_{FL}$ and the volumes of the rear liquid chambers $R_{RU}$ and $R_{RL}$ are alternately enlarged and reduced. Consequently, a liquid flows back and forth between the front liquid chambers $R_{FU}$ and $R_{FL}$ and the rear liquid chambers $R_{RU}$ and $R_{RL}$ through the upper and the lower first communication passages $O_1$ and $O_1$, and damping forces against forward and rearward loads occur due to the resistance of the liquid at that time. Then, if a larger load is input in the forward or rearward direction, the bushing rubber 21 comes into abutment with the front rubber stopper 22 or the rear rubber stopper 23 which perform a stopper function to inhibit a further increase in the relative amount of movement of the outer tube 11 and the inner tube 14.

In addition, a medium-frequency load of approximately 80–250 Hz is input to the outer tube 11 of the liquid-encapsulated bushing B in the upward and the downward directions (in the Z–Z' direction of FIG. 2). If the outer tube 11 relatively moves in the upward and the downward directions with respect to the inner tube 14 in response to the input of the load, the bushing rubber 21 is deformed and the volumes of the upper front liquid chamber $R_{FU}$ and the rear liquid chamber $R_{RU}$ and the volumes of the lower front liquid chamber $R_{FL}$ and the rear liquid chamber $R_{RL}$ are alternately enlarged and reduced. Consequently, the liquid flows back and forth between the upper and the lower front liquid chambers $R_{FU}$ and $R_{FL}$ through the front second and third communication passages $O_2$ and $O_3$, while the liquid flows back and forth between the upper and the lower rear liquid chambers $R_{RU}$ and $R_{RL}$ through the rear second communication passage $O_2$. Thus, a dynamic spring constant is lowered by a liquid-column resonance phenomenon occurring in the second communication passages $O_2$ and $O_2$ and the third communication passage $O_3$ during that time, whereby a reduction in road noise is achieved.

Figure 4:
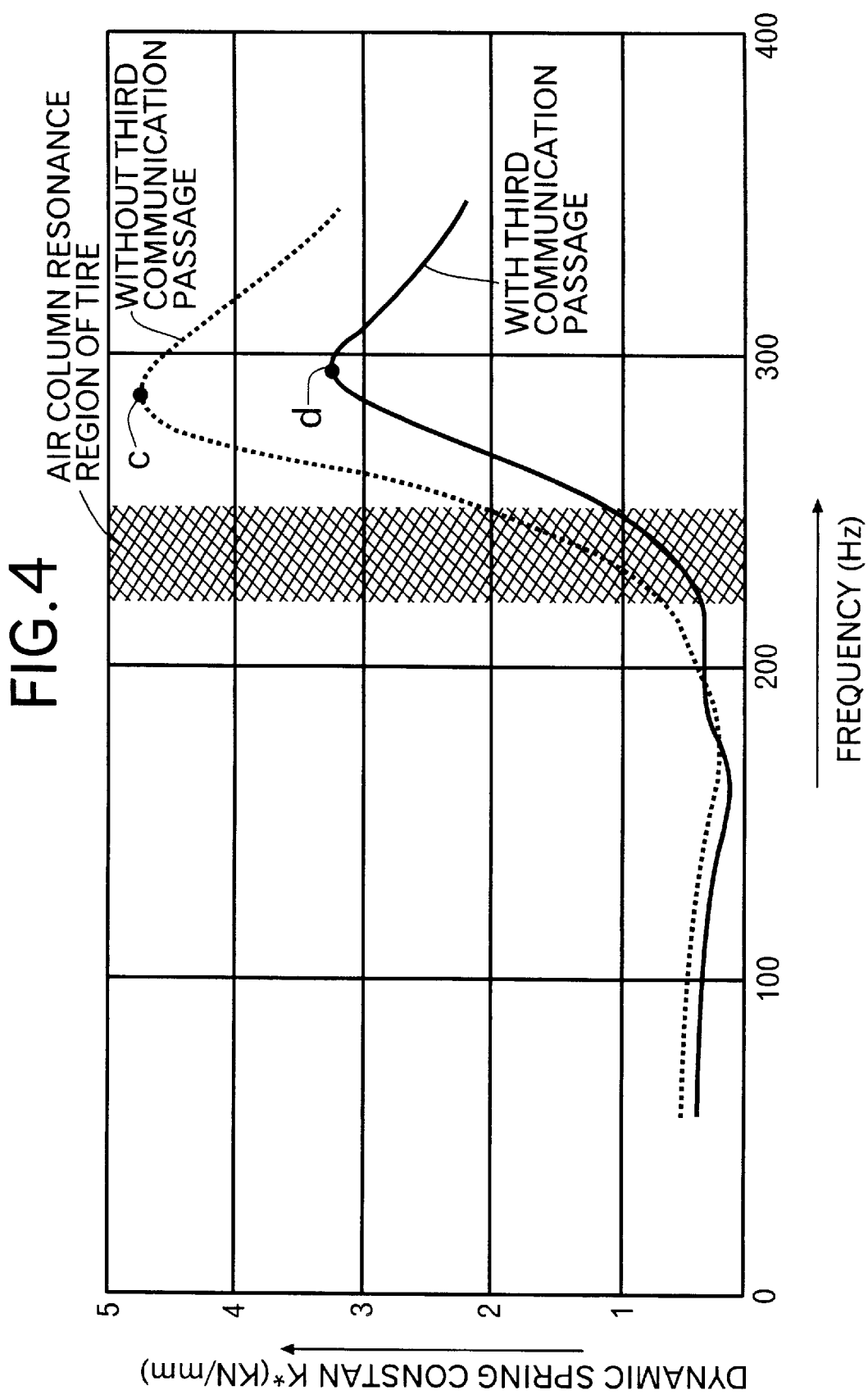

The graph of FIG. 4 shows variation characteristics of the dynamic spring constant of the liquid-encapsulated bushing B with respect to a variation in the frequency input in the upward and the downward directions. A dotted line denotes the characteristic of the liquid-encapsulated bushing which does not have the third communication passage $O_3$. The liquid-encapsulated bushing without the third communication passage has the problem that its dynamic spring constant does not become sufficiently low in a frequency region of 220–250 Hz which is the air column resonance region of the tire. In contrast, in the liquid-encapsulated bushing of the present embodiment (shown by a solid line) which has the third communication passage $O_3$ in addition to the second communication passages $O_2$ and $O_2$, the dynamic spring constant is lowered in the air column resonance region of the tire, whereby road noise can be effectively reduced over the entire medium frequency region of 80–250 Hz. In this manner, since it is possible to lower the dynamic spring constant without increasing the hardness of the bushing rubber 21, it is possible to reduce road noise without incurring a deterioration in riding comfort due to an increase in the hardness of the bushing rubber 21. In addition, since the third communication passage $O_3$ is constituted by a block-shaped groove, which is defined in the back surface of the front stopper 17, it is possible to form the third communication passage $O_3$ without the need for any special member or without influencing the layout of another member.

Figure 5:
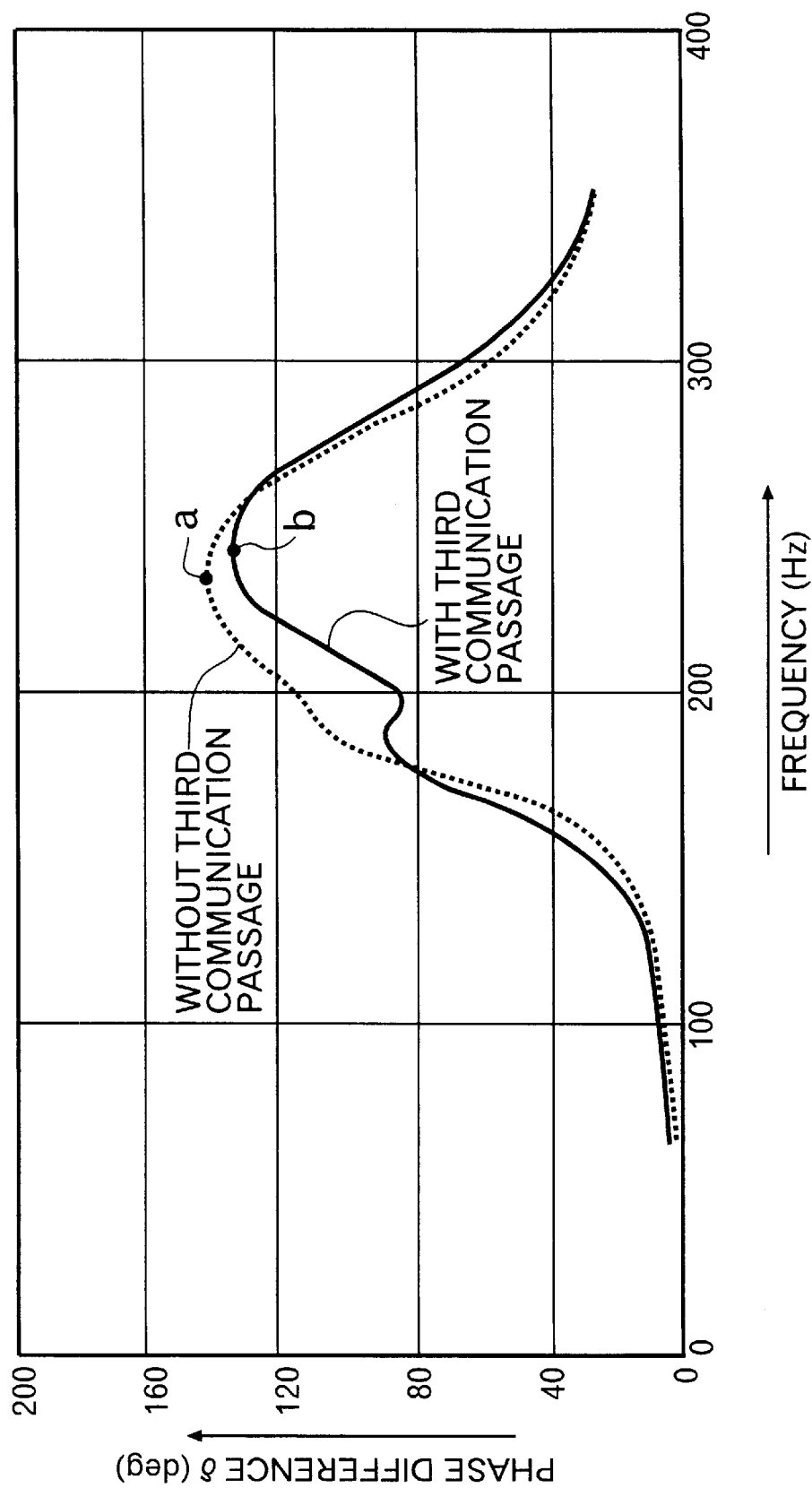

It is considered that a lowering of the dynamic spring constant in the air column resonance region of the tire occurs for the following reason. Since the sum of the cross-sectional areas of the communication passages is increased by the addition of the third communication passage $O_3$, as compared with the liquid-encapsulated bushing having only the second communication passages $O_2$ and $O_2$, the peak of a phase difference a between the input and the output of the liquid-encapsulated bushing B is shifted toward a higher-frequency side (refer to a→b in FIG. 5). Since the peak of the dynamic spring constant is also shifted toward a higher-frequency side (refer to c→d in FIG. 4) by the shift of the peak of the phase difference δ, the dynamic spring constant is lowered in the air column resonance region of the tire on a side having a lower frequency than the peak.

In addition, a resonance system defined between the upper and lower front liquid chambers $R_{FU}$ and $R_{FL}$ and a resonance system defined between the upper and the lower rear liquid chambers $R_{RU}$ and $R_{RL}$ differ from each other in resonant frequency. Therefore, the peak value of the dynamic spring constant is also lowered.

Figure 6:
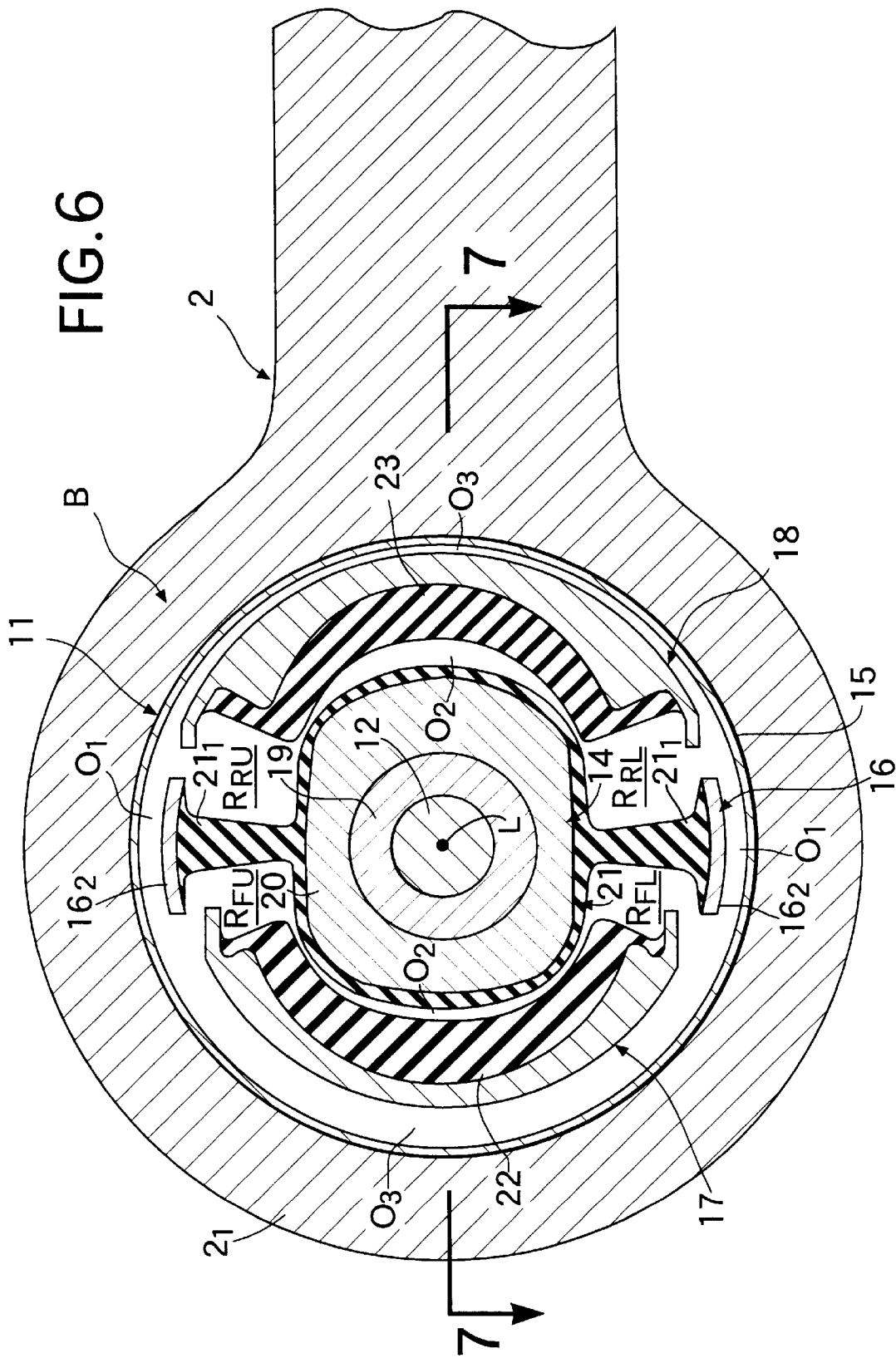
FIG. 6 is a view similar to FIG. 2, but showing a second embodiment of the present invention.
Figure 7:
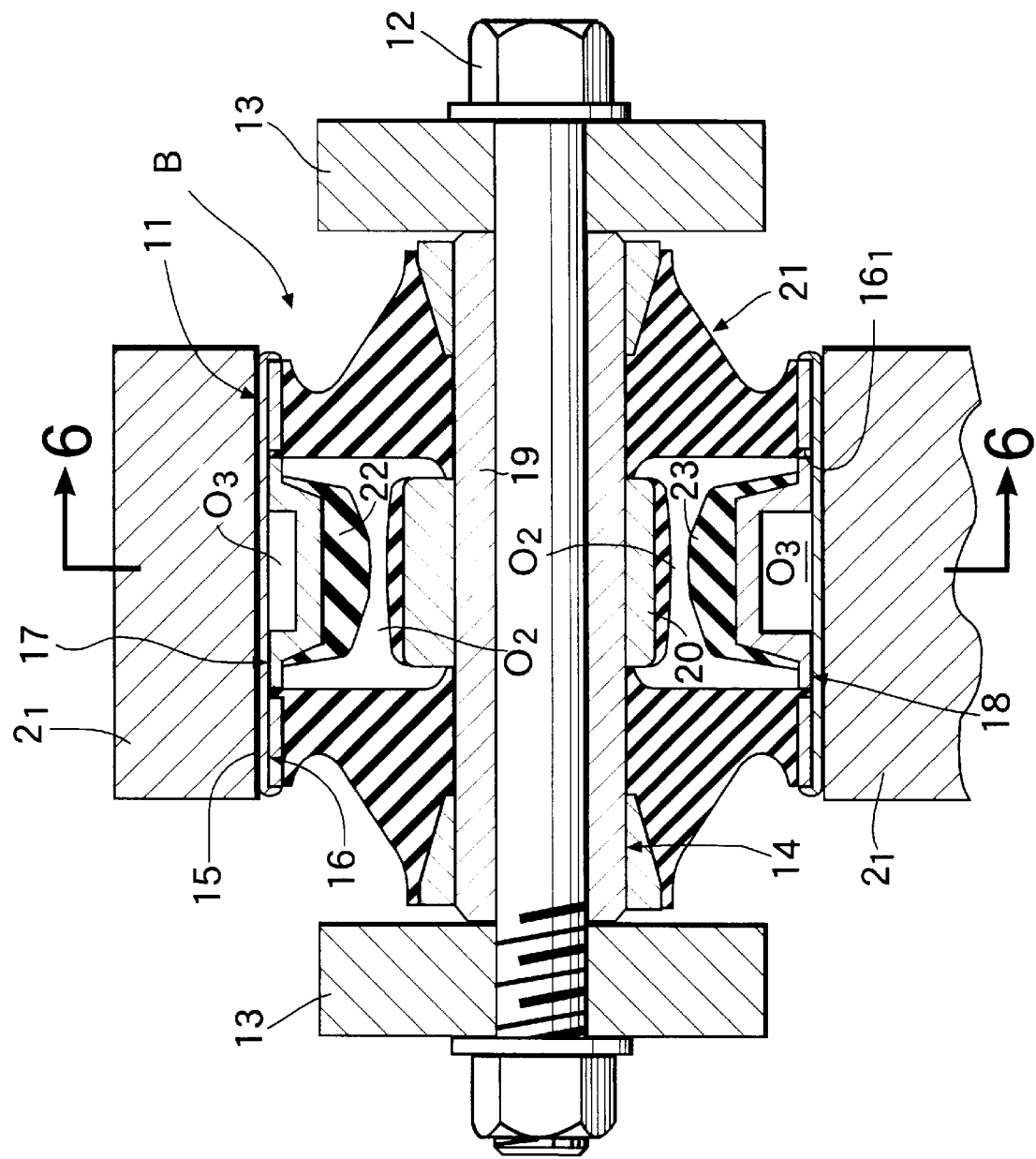
FIG. 7 is a cross-sectional view taken along a line 7—7 of FIG. 6.
Figure 8:
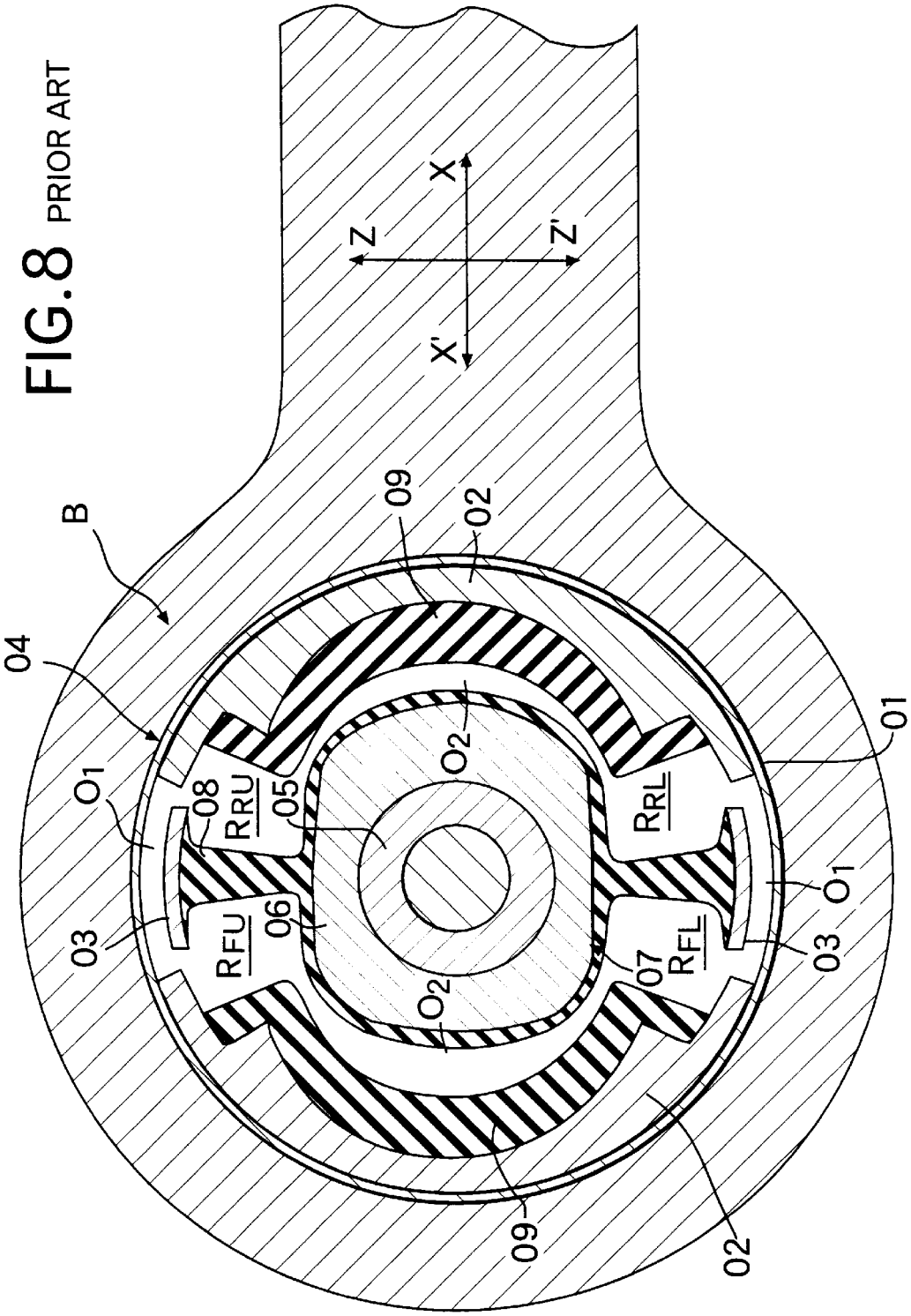
FIG. 8 is a cross-sectional view of a conventional liquid-encapsulated bushing.
Figure 9:
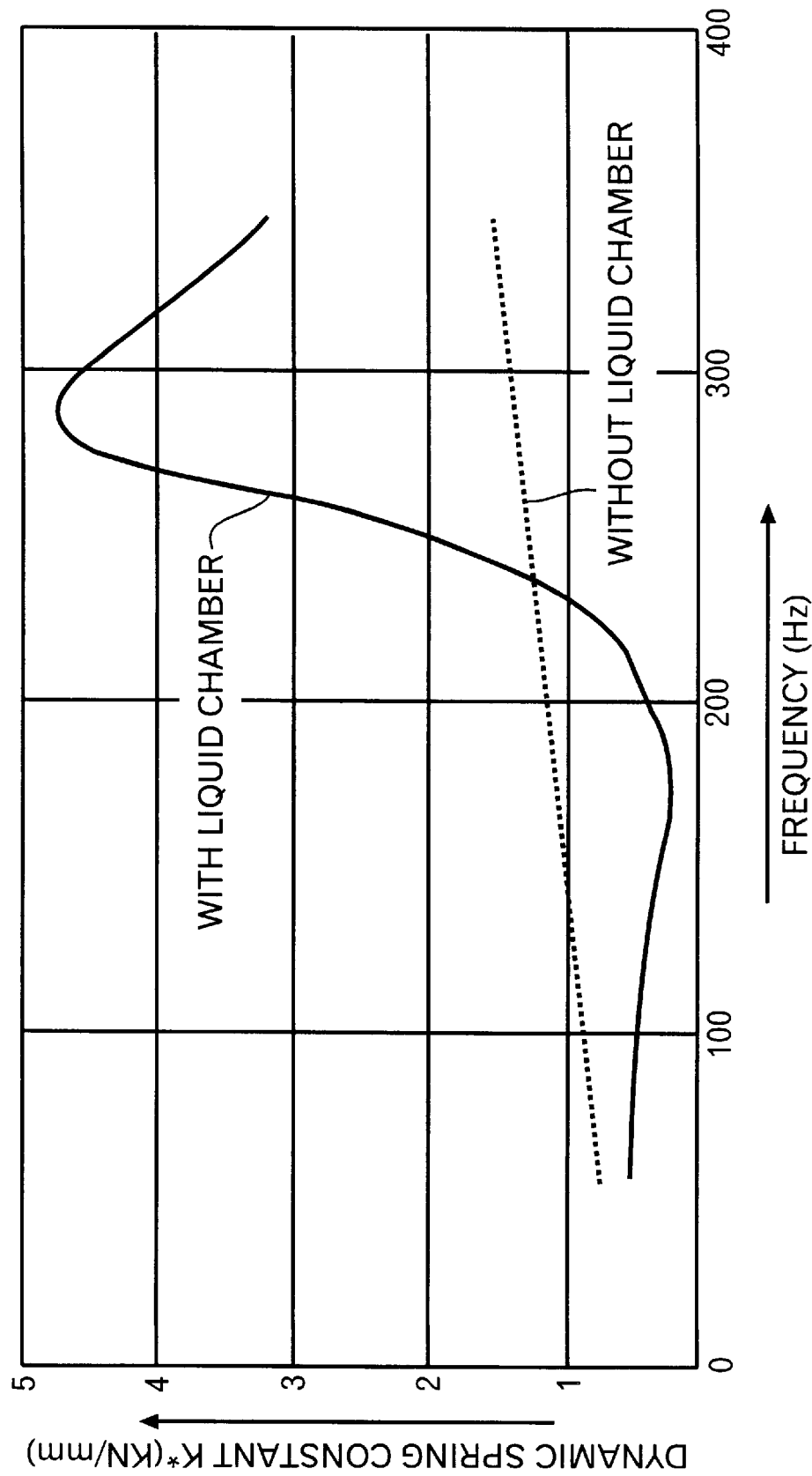
FIG. 9 is a graph showing a relationship between the frequency and the dynamic spring constant of the conventional liquid-encapsulated bushing.

A second embodiment of the present invention will now be described below with reference to FIGS. 6 and 7.

In the second embodiment, another third communication passage $O_3$ is defined between the front stopper 18 and the outer member 15 in addition to the third communication passage $O_3$ defined between the front stopper 17 and the outer member 15. It is possible to easily and finely adjust the dynamic spring constant by making the cross-sectional area and the length of the front third communication passage $O_3$ different from those of the rear third communication passage $O_3$.

As described above, in accordance with the first embodiment of the invention, a third communication passage is disposed in parallel with a second communication passage and provides communication among liquid chambers whose volumes vary. Since the third communication passage is defined along a first outer tube, the peak of a dynamic spring constant of the liquid-encapsulated bushing in a second direction is shifted toward a higher-frequency side with an increase in the sum of the cross-sectional areas of the second communication passage and the third communication passage. Therefore, it is possible to lower the dynamic spring constant in the air column resonance region of a tire on a side having a lower frequency than the peak. Thus, it is possible to lower the dynamic spring constant in the air column resonance region of the tire without increasing the hardness of an elastic body. Hence it is possible to reduce road noise.

In accordance with the second embodiment of the present invention, two third communication passages are defined along an axis on opposite sides of the axis. Therefore, it is possible to finely adjust the dynamic spring constant by varying the shapes of the two third communication passages.

Although the embodiments of the present invention have been described above in detail, various modifications in design of the present invention may be made without departing from the spirit and scope of the present invention.

What is claimed is:

1. A liquid-encapsulated bushing comprising:
    an outer tube and an inner tube each having an axis parallel to each other;
    stopper means, provided at an inner peripheral portion of said outer tube, for regulating an amount of relative movement between said outer and inner tubes;
    a plurality of communication passages;
    an elastic body connecting said inner and outer tubes; and
    a plurality of liquid chambers defined to face said elastic body, said plurality of liquid chambers are placed in communication with each other by said plurality of communication passages to damp a low-frequency load input in a first direction perpendicular to the axis and a medium-frequency load input in a second direction perpendicular to both the axis and the first direction,
    said plurality of communication passages including:
        a first communication passage which is defined in said outer tube to provide communication among said liquid chambers whose volumes vary when a) the load in the first direction is input and b) said outer tube and said inner tube move relative to each other;
        a second communication passage which faces said stopper means and which is defined between said outer tube and said inner tube to provide communication among said liquid chambers whose volumes vary when a) the load in the second direction is input and b) said outer tube and said inner tube move relative to each other; and a third communication passage which is defined in said outer tube extending along said stopper means on a side of said stopper means which is opposite to said second communication passage and which is disposed in parallel with said second communication passage and provides communication among said liquid chambers whose volumes vary.

2. A liquid-encapsulated bushing according to claim 1, wherein said third communication passage includes two third communication passages each provided on opposite sides of the axis.

3. A liquid-encapsulated bushing according to claim 1, wherein said liquid-encapsulated bushing is provided at a position where a front end of a radius rod of a suspension of an automobile is supported on a vehicle body.

4. A liquid-encapsulated bushing according to claim 1, wherein said low-frequency load is a load of substantially 15 Hz and said medium-frequency load is a load substantially in a range of 80 to 250 Hz.

5. A liquid-encapsulated bushing according to claim 1, wherein said stopper means includes a front and rear stopper.

6. A liquid-encapsulated bushing according to claim 5, wherein said second communication passage is defined between the elastic body and the front stopper and between the elastic body and the rear stopper.

7. A liquid-encapsulated bushing according to claim 5, wherein said third communication passage is defined between the front stopper and the outer tube.

8. A liquid-encapsulated bushing according to claim 6, wherein said third communication passage is defined between the front stopper and the outer tube.

* * * * *